Sept. 22, 1964  B. R. BALDRIDGE  3,149,849
CRUCIFORM RUBBER SUPPORT RING FOR PLASTIC CAP RINGS
Filed June 30, 1961

INVENTOR.
BILLIE R. BALDRIDGE
BY
J. Edwin Coates
ATTORNEY

United States Patent Office 3,149,849
Patented Sept. 22, 1964

3,149,849
CRUCIFORM RUBBER SUPPORT RING FOR
PLASTIC CAP RINGS
Billie R. Baldridge, Sherman Oaks, Calif., assignor to
Douglas Aircraft Company, Inc., Santa Monica, Calif.
Filed June 30, 1961, Ser. No. 121,142
9 Claims. (Cl. 277—165)

This invention relates to fluid seals and particularly to that type of dynamic fluid seal which is used to prevent leakage between relatively moving parts which have mating cylindrical surfaces.

The most commonly used dynamic fluid seal in recent years has been the well known O-ring, which is a ring of rubber or rubber-like material mounted in a generally rectangular cross-section groove in one of the cylindrical mating parts. One of the problems with such seals has been that at the higher pressures, from 1000 p.s.i. up, the axial force applied to the O-ring has been so great as to cause it to extrude in the form of a very thin tube into the clearance between the moving parts. This difficulty has been largely overcome by the use of zero clearance backup rings, usually made of polytetrafluoroethylene resin under the trade name "Teflon" in the form of a multiple spiral as disclosed in the patent to Traub, No. 2,749,193. That invention has taken care of the extrusion problem for most installations where the pressures have been less than 5000 p.s.i. However, at the higher pressures currently being used in many instances the thin-walled "Teflon" rings there disclosed have themselves been extruded in a relatively short time.

Another problem with such seals has been the fact that rubber or rubber-like material has a tendency to stick to metal when dry. Consequently, when an old style O-ring seal has remained stationary for some time the constant radial pressure of the resilient material has forced practically all of the lubricant out of the area between the ring and its mating surface. Upon subsequent movement the O-ring is torn loose and suffers some damage. Repeated occurrences result in a relatively short life for such combination.

This problem has been partially ovecome by constructions such as disclosed in the patents to Groen No. Re. 24,440 and Tisch, No. 2,968,501, in each of which a unitary cap seal of "Teflon" with a thin mid-portion and thick ends or flanges is mounted over the O-ring to protect it from excessive wear as well as to prevent extrusion. Each of these has its disadvantages. In Groen, the rubber ring is pushed and twisted from side to side by changes in pressure, which leads to early failure. Also, at lower pressures, the ring applies pressure only at the mid point of the axial length of the cap seal, allowing it to bend in at its ends so that some fluid works in between the cap seal and the mating surface and gradually leaks by. At higher pressures, the O-ring is forced to one end of the groove and provides even less support for the critical end of the cap ring facing the high pressure fluid.

Tisch applies pressure across a greater portion of the axial length of the cap ring but fills the grooves so completely that it is difficult and in some cases impossible to assemble the parts. In its free state and as urged outwardly by the triangular O-ring, the cap ring extends beyond the periphery of the piston or similar part on which it is mounted. When the piston is pushed axially into the opening in the cylinder, the first end of the cap ring must be forced radially into the groove. Since the groove is almost completely filled with the pressure ring, the latter is immediately squeezed down at the first end and bulges out at the other end. This, of course, forces the cap ring even farther outward and the cylinder binds on the cap ring. If a great deal of axial force is applied the ring may be forced into the groove, suffering damage to its surface as a result. In some cases it simply cannot be forced in and the assembly cannot be completed.

The present invention retains the advantages above mentioned but overcomes the disadvantages by its novel construction. In general it provides, in a pair of relatively movable members with cylindric mating surfaces and a groove of rectangular cross-section in one of them, a cap ring having a base comprising an elongate thin cylindric shell with an annular flange at each end of the base extending radially into the groove. The cap seal is of substantially the same axial length as the groove. Located in the groove and nested in the channel formed by the base and flanges is a rubber or rubber-like pressure ring or annulus.

It is generally cruciform in cross-section and has an axially intermediate portion with cylindric inner and outer walls which engage the bottom of the groove and the inner wall of the cap ring with uniform pressure. The "arms" of the cross constitute generally cylindric bosses extending axially from each end of the intermediate portion so that their free edges are spaced radially inwardly and outwardly of the outer and inner walls of the intermediate portion respectively.

The total radial thickness of the cap ring and pressure ring is greater than the depth of the groove. Hence, when the parts are assembled the pressure ring is radially squeezed because it is resilient and relatively soft while the cap ring, although flexible, is tough and hard compared to the pressure ring. The latter exerts sufficient force to keep the cap ring pressed tightly against its mating surface but not enough to stretch it radially to any appreciable extent. When the pressure ring is compressed radially it expands axially so that its total axial length is substantially equal to that of the groove.

The bosses just contact the inner edges of the flanges to support them but provide a sizeable gap into which the one flange can be squeezed during assembly. In addition, the effective clearance on the radially opposite side of each boss permits it to be displaced to further facilitate assembly. The total clearance of the four gaps precludes forcing the following end of the cap ring excessively out of the groove during the assembly operation.

Various other advantages and features of novelty will be apparent as the description proceeds in connection with the accompanying drawing in which.

Figure 1:
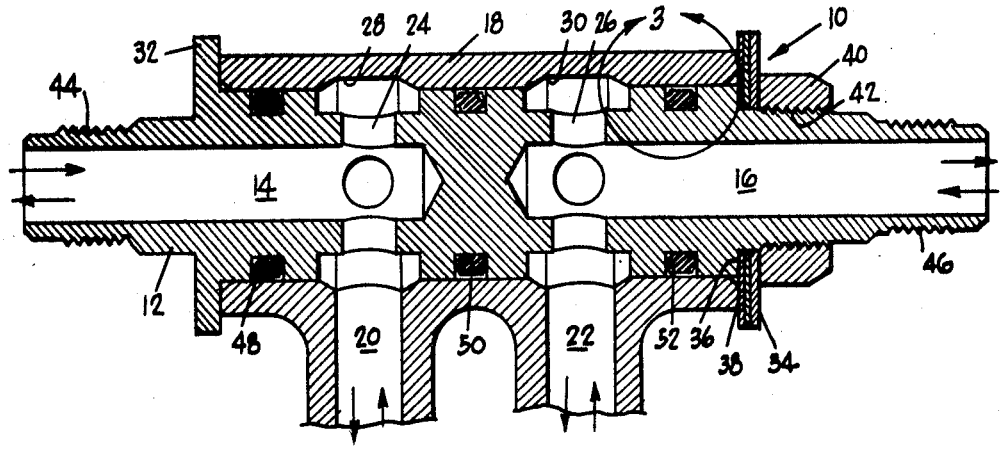
FIG. 1 is a fragmentary side elevational view, in section, of a swivel connection in which the present seal is installed.

Referring now to the drawings, FIG. 1 represents a conventional simple swivel connection 10 in a system for supplying reversible flow hydraulic fluid under pressure to a device such as an aileron servo motor where the servo is movable with respect to the structure and it is desired not to use flexible hydraulic conduits. It comprises essentially a conduit body 12 having two independent supply and return conduit paths 14 and 16 and a "banjo" type swivel member 18 having independent supply and return conduit paths 20 and 22, each swivelly connected in all adjusted positions to its respective conduit paths 14 and 16 by way of parts 24, 26 and chambers 28, 30.

The conduit body is provided with a fixed flange 32 near its left end. After member 18 is slipped over the conduit body into its working relation with the conduit body and against flange 32, a plurality of washers 34 are slipped over the right end of the conduit body to seat against shoulder 36 and contact the end 38 of the swivel member with just enough clearance for easy rotating movement. Nut 40 is then reached onto threads 42 and against washers 34 to hold the parts in assembled relation. The threaded ends 44 and 46 of the conduit body are adapted for attachment to standard hydraulic conduit connections.

Figure 2:
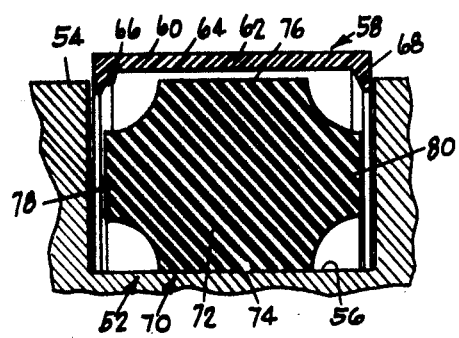
FIG. 2 is a fragmentary side elevational view, in section, of a portion of the swivel connection with the seal in the course of installation in the groove.

To prevent cross flow between the conduits and leakage out of the swivel connection, sealing means of identical character are provided at points 48, 50 and 52 as shown. There is illustrated in FIG. 2 a portion 54 of the conduit body 12 provided with an annular groove 56 of generally rectangular cross-section with the inner corners filleted. The cap ring and pressure ring are in position but are not yet forced into place by the assembly. In fact they are shown in somewhat exploded fashion for clarity of illustration.

The cap ring 58 comprises a base in the form of an elongate thin-walled shell 60 having inner and outer cylindric walls 62 and 64, the diameter of the outer wall being substantially identical in dimension to the diameter of the mating part to be sealed. At the ends of the base are located flanges 66, 68 which extend inwardly of the groove. It will be noted that whether the groove is in the male or female part, the groove is "inward" and the mating part to be sealed is "outward," and these terms are to be so construed wherever used throughout the specification or claims. The cap ring is preferably made of a material which is tough but somewhat flexible and which has the lowest possible coefficient of friction with the mating part. The presently preferred material is a polytetrafluorethylene resin which is sold under the trademark "Teflon." In addition to being tough, almost "hard," as well as somewhat yieldable, it is in the nature of a solid lubricant and hence has a low coefficient of friction with metal even when wiped free of the usual lubricating materials. The total axial length of the cap ring including the flanges is substantially the same as that of the groove, with working clearance. In order to show the pressure ring in its undistorted condition in FIG. 2, the cap ring is shown in exaggerated expanded condition. Actually it extends only a very slight distance out of the groove when finally seated at rest.

The pressure ring 70 includes an axially intermediate, radially thick portion 72 having generally cylindric inner and outer walls 74, 76, and generally cylindric axial extensions in the form of bosses 78, 80, joined to the main body with substantial fillets, which have larger inside and smaller outside diameters than the main body of the ring. The pressure ring is composed of a rubber or rubber-like elastomeric material, which has the properties of elastic flow so that it can be distorted completely out of shape and return to its original shape immediately upon release of the distorting forces. Thus it will be distorted readily by any loading applied to it by the "Teflon" cap ring which, although flexible, is much harder than the pressure ring.

The proportions of the pressure ring vary somewhat with the diameter of the cap ring and with other features of the installation. However, the total axial length of the ring in its undistorted condition is always greater than the axial thickness, the ratio being of the order of four to three. The axial length of the intermediate portion bearing the cylindrical walls ranges from about one third to one half the total axial length of the ring and ranges from about one half to about two thirds of the length of the shell 60 of the cap ring between the flanges. With these proportions the pressure ring is quite stable in the groove and exerts a uniform radial pressure over a very substantial part of the axial length of the cap ring. Actually the internal diameter of the pressure ring is slightly less than the diameter of the bottom of the groove so that it tends to bind in place.

Figure 3:
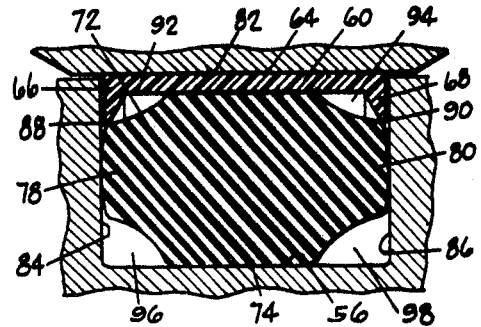
FIG. 3 is a view similar to FIG. 2 but showing the seal completely installed in the area indicated by arrows 3 in FIG. 1.

It will be observed in FIG. 3 that when the rings are completely in place and the assembly is completed with the cap ring inside the land 82 the compression ring has been radially squeezed to a substantial extent and has flowed elastically so that bosses 78 and 80 contact the side walls 84, 86 of the groove. Also the outer free edges 88, 90 of the bosses now contact the inner edges of flanges 66 and 68 for supporting purposes. The resulting arrangement of parts provides four annular voids or reliefs 92, 94, 96, 98 for purposes to be described.

It will now be seen that the novel pressure ring is quite stable against fore and aft sliding and rotation and that, under compression, it provides a substantial and uniform radial pressure against the thin shell of the cap ring throughout a great part of its length. With the added support of the bosses under the flanges, the cap ring will remain in good sealing contact with the mating surface throughout its length.

Figure 4:
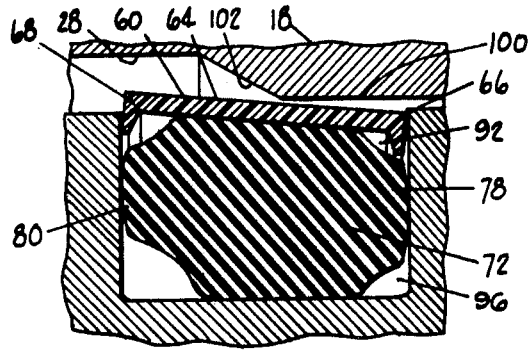
FIG. 4 is a fragmentary side elevational view, in section, of a seal in place in a groove of a hydraulic part, showing the cocking action which takes place during assembly.

FIGURE 4 illustrates the difficulty encountered when it is necessary to install a swivel member like 18 over a conduit body by sliding it lengthwise when several ring sets are in position in their grooves. The figure shows the critical point in the operation. The entry of the first seal into the end of the fitting is not so difficult because the seal is still in the open and suitable tools can be applied to compress and guide it. However, the rest of the operation is blind. It must be right the first time. If the fittings are taken apart for inspection and found to be satisfactory nothing is gained because they must be reassembled with no way to observe the progress of the operation.

At the stage shown in FIG. 4, the seal has passed chamber 28 and is entering the succeeding land 100. The leading flange 66 has encountered the sloping wall 102 of the chamber and has been depressed enough to enter the land. If the pressure ring filled all of the available space, its distortion would now tilt flange 68 so far out that progress would be halted. If excessive force were applied it might possibly be moved farther but at the expense of damaging the sealing surface of the cap ring. However, in the present case, the void 92 provides some room for inward movement of flange 66 without excessive compression of the pressure ring. In addition boss 78 can be bent or urged downwardly into void 96 to provide added accommodation. Since the void 98 has grown considerably it provides added space for the following edge of the ring to be urged inwardly without applying excessive force. It has been found in practice that the assembly operation described above takes place every time with no damage to the cap ring, thus assuring perfect sealing of the relatively moving parts.

While the construction and operation have been described with reference to rotatable hydraulic parts it is obvious that it is equally applicable to reciprocating parts, although the problems in such mechanisms are not usually so severe.

It will be apparent to those skilled in the art that various changes and modifications may be made in the construction described without departing from the spirit of the invention and it is intended that all such changes and modifications shall be embraced within the scope of the following claims.

I claim:

1. A seal for preventing the leakage of fluid between two relatively movable members having mating cylindric surfaces with working clearance therebetween, one of said surfaces having an annular groove of substantially rectangular cross-section confronting the other surface, in which groove the seal is seated, said seal comprising: a continuous annular cap ring of tough but flexible material having a low coefficient of friction with respect to the material of said other surface; said cap ring having a base comprising a thin shell with cylindric inner and outer walls and a pair of radially projecting flanges at its ends cooperating to form a channel, said cap ring including the flanges having an axial length substantially the same as that of the groove and being receivable therein with said flanges extending toward the bottom of the groove and with its outer surface slidably engageable with the surface of the other relatively movable member; and a resilient, deformable, rubber-like, annular pressure ring seated in said groove and nested within the channel of said cap ring for urging the cap ring into sealing engagement with the surface which it contacts; said pressure ring being cruciform in cross-section with one pair of arms extending radially and one pair of arms extending axially to provide an axially central body portion extending from the bottom of the groove to the adjacent wall of the cap ring and resiliently supporting the axially central section of said cap ring throughout a substantial portion of its length; the axially extending arms being spaced generally centrally between the inner and outer walls of said pressure ring to constitute annular bosses, each providing inner and outer annular recesses to facilitate installation of said seal in an assembly of relatively movable members.

2. A seal as claimed in claim 1 in which the total axial length of said pressure ring is substantially greater than the total-radial thickness thereof.

3. A seal as claimed in claim 1 in which the ratio of the total axial length of said presure ring to its total radial thickness is of the order of four to three.

4. A seal for preventing the leakage of fluid between two relatively movable members having mating cylindric surfaces with working clearance therebetween, one of said surfaces having an annular groove of substantially rectangular cross-section confronting the other surface, in which groove the seal is seated, said seal comprising: a continuous annular cap ring of tough but flexible material having a low coefficient of friction with respect to the material of said other surface; said cap ring having a base comprising a thin shell with cylindric inner and outer walls and a pair of radially projecting flanges at its ends cooperating to form a channel, said cap ring including the flanges having an axial length substantially the same as that of the groove and being receivable therein with said flanges extending toward the bottom of the groove and with its outer surface slidably engageable with the surface of the other relatively movable member; and a resilient, deformable, rubber-like, annular pressure ring seated in said groove and nested within the channel of said cap ring for urging the cap ring into sealing engagement with the surface which it contacts; said pressure ring being generally cylindrical in shape with the ends adjacent said flanges recessed to provide a substantial peripheral gap at each end confronting the junctions between said base and said flanges, thereby facilitating inward displacement of one end of said cap ring toward the bottom of the groove during axial assembly without correspondingly forcing the other end of said cap ring out of said groove.

5. A seal as claimed in claim 4 in which the ends of said pressure ring radially opposite said first recessed ends are similarly recessed to provide cylindric bosses radially yieldable to further facilitate the radial displacement of the cap ring end during assembly.

6. A pressure ring for use in an assembly including relatively movable elements having cylindric mating surfaces with a seal groove of generally rectangular cross-section in one of said elements and a cap ring in said groove, said cap ring having a cylindric base with flanges at each end extending radially inward of said groove, said pressure ring comprising: an annulus of resilient, deformable, rubber-like material having an axially intermediate radially thick portion to bottom in the groove and provide resilient radial support for a substantial axial length of the axially intermediate portion of the cap ring; the ends of said pressure ring being recessed to provide a substantial peripheral gap at each end to confront the junctions between the base and flanges of the cap ring and facilitate inward displacement of one end of the cap ring toward the bottom of the groove during axial assembly without correspondingly forcing the other end of the cap ring out of the groove.

7. A pressure ring as claimed in claim 6; the ends of said pressure ring being recessed at both the axially inner and axially outer edges to further facilitate displacement of the cap ring during assembly; the remaining radially thin, axially extending ends of said pressure ring constituting annular bosses spaced between the inner and outer peripheries of said pressure ring.

8. A pressure ring as claimed in claim 6 in which the axial length of the intermediate portion of said pressure ring is of the order of one half of the total axial length of said ring.

9. A pressure ring as claimed in claim 6 in which the radial thickness of said ring is of the order of three fourths of the total axial length of said ring.

References Cited in the file of this patent

UNITED STATES PATENTS

| | | |
|---|---|---|
| 2,159,825 | Stevens | May 23, 1939 |
| 2,247,609 | Devilbliss | July 1, 1941 |
| 2,392,182 | Payne | Jan. 1, 1946 |
| 2,841,429 | McCuistion | July 1, 1958 |
| 2,909,398 | Taylor | Oct. 20, 1959 |
| 2,915,349 | Gomberg | Dec. 1, 1959 |
| 2,968,501 | Tisch | Jan. 17, 1961 |
| 3,052,478 | Horvereid | Sept. 4, 1962 |

FOREIGN PATENTS

| | | |
|---|---|---|
| 738,055 | Great Britain | Oct. 5, 1955 |
| 1,214,899 | France | Nov. 16, 1959 |